United States Patent
Kimura

(10) Patent No.: US 9,268,255 B2
(45) Date of Patent: Feb. 23, 2016

(54) IMAGE FORMATION SYSTEM AND DENSITY CONTROLLING METHOD

(71) Applicant: Konica Minolta, Inc., Tokyo (JP)

(72) Inventor: Takenobu Kimura, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/657,477

(22) Filed: Mar. 13, 2015

(65) Prior Publication Data
US 2015/0261130 A1   Sep. 17, 2015

(30) Foreign Application Priority Data
Mar. 14, 2014   (JP) .................................. 2014-052310

(51) Int. Cl.
G03G 15/00   (2006.01)
G03G 15/08   (2006.01)

(52) U.S. Cl.
CPC .... *G03G 15/0824* (2013.01); *H04N 2201/0082* (2013.01); *H04N 2201/0093* (2013.01)

(58) Field of Classification Search
CPC .................. G03G 15/0824; H04N 2201/0093; H04N 2201/0082
See application file for complete search history.

(56) References Cited

U.S. PATENT DOCUMENTS

| 6,768,878 B2 * | 7/2004 | Komatsu ............ G03G 15/5037 399/46 |
| 2006/0115284 A1 * | 6/2006 | Grace ................ G03G 15/5062 399/49 |
| 2007/0122168 A1 | 5/2007 | Tanaka et al. |

FOREIGN PATENT DOCUMENTS

| JP | 4949672 B2 | 3/2012 |
| JP | 4995123 B2 | 8/2012 |

\* cited by examiner

*Primary Examiner* — David Gray
*Assistant Examiner* — Michael Harrison
(74) *Attorney, Agent, or Firm* — Lucas & Mercanti, LLP

(57) ABSTRACT

An image formation system includes: a first image forming apparatus; a sheet inversion section; a second image forming apparatus; an image density detection section configured to detect a density of a first pattern image for a highest density adjustment and a density of a second pattern image for a half-tone density adjustment, each of the first and second pattern images being formed on a sheet in each of the first image forming apparatus and the second image forming apparatus; and an inter-apparatus density adjusting section. The inter-apparatus density adjusting section corrects a density control point and a light exposure energy on a basis of detection results of the first and second pattern images of the image density detection section, respectively. The first and second density control sections correct the density control point or the light exposure energy in accordance with a coverage rate of an image.

6 Claims, 9 Drawing Sheets

IMAGE FORMATION SYSTEM AND DENSITY CONTROLLING METHOD

CROSS REFERENCE TO RELATED APPLICATIONS

This application is entitled to and claims the benefit of Japanese Patent Application No. 2014-052310, filed on Mar. 14, 2014, the disclosure of which including the specification, drawings and abstract is incorporated herein by reference in its entirety.

BACKGROUND OF THE INVENTION

1. Field of the Invention

The present invention relates to a tandem-type image formation system including two electrophotographic image forming apparatuses connected together in tandem, in which an image is formed on a first surface (front surface or rear surface) of a sheet in the image forming apparatus disposed on the upstream side in the sheet conveyance direction, and an image is formed on a second surface (rear surface or front surface) of the sheet in the image forming apparatus disposed on the downstream side. The present invention also relates to an density controlling method in the image formation system.

2. Description of Related Art

In general, an electrophotographic image forming apparatus (such as a printer, a copy machine, and a fax machine) is configured to irradiate (expose) a uniformly-charged photoconductor (for example, a photoconductor drum) with (to) light based on image data to form an electrostatic latent image on the surface of the photoconductor. The electrostatic latent image is then visualized by supplying toner from a developing device to the photoconductor on which the electrostatic latent image is formed, whereby a toner image is formed. Further, the toner image is directly or indirectly transferred to a sheet through an intermediate transfer belt, followed by heating and pressurization for fixing, whereby an image is formed on the sheet.

In such an electrophotographic image forming apparatus, an image density control (also called "image stabilization control") is performed to stably maintain desired image quality. To be more specific, a toner pattern for density detection is formed on an image bearing member such as an intermediate transfer belt, and the density of the toner pattern (toner adhesion amount) is detected using a light sensor of a reflection type or a transmission type. Then, the image formation conditions such as the light exposure energy (light exposure time or light exposure output), charging voltage, developing bias voltage, rotational frequency of a developing roller are controlled based on the detection results such that the density of the toner pattern matches the target control density. The target control density is set in accordance with the level of density control points which are set in a stepwise manner. The light sensor used in the image density control is called "IDC (Image Density Control) sensor."

Furthermore, techniques have been proposed in which the image formation condition is controlled in accordance with the tendency of the coverage rate (coverage) in the case where image formation is continuously performed on a plurality of sheets (PTL 1: Japanese Patent Publication No. 4995123 and PTL 2: Japanese Patent Publication No. 4949672).

In recent years, in the field of the production print in which a high throughput is demanded, the tandem-type image formation system in which two electrophotographic image forming apparatuses in tandem are connected with each other is put in practical use. In general, in a tandem-type image formation system, a sheet inversion apparatus is disposed between an image forming apparatus on the upstream side in the sheet conveyance direction (hereinafter referred to as "upstream apparatus") and an image forming apparatus on the downstream side (hereinafter referred to as "downstream apparatus"). When duplex image formation is performed, first, an image is formed on a first surface of a sheet (front surface or rear surface) by the upstream apparatus, and then the sheet is inverted by the sheet inversion apparatus, and thereafter, an image is formed on a second surface of the sheet (rear surface or front surface) by the downstream apparatus.

Also in the above-described tandem-type image formation system, the image density control is performed in each of the two image forming apparatuses. However, the output performances of the IDC sensors of the image forming apparatuses may be different from each other. Therefore, even when the image density control of the same density control point is performed, the densities of the images actually formed on the sheet may not be the same. This may results in a difference in the density between the front and rear surfaces of the sheet, and a difference in the image quality between the front and rear surfaces.

In addition, in the case where two-component developer is used, a difference in the consumption amount of toner, or in other words, a difference in the amount of toner to be supplied, is caused due to a difference in the coverage rate of the original image data even when the density control point of the IDC sensor is corrected such that the image densities on a sheet are identical to each other between the upstream apparatus and the downstream apparatus at an initial stage of the image formation. In this manner, the development performance is changed, and consequently, a density difference between the front and rear surfaces may possibly be gradually caused.

SUMMARY OF THE INVENTION

An object of the present invention is to provide a tandem-type image formation system and an density controlling method which can stabilize the density of images on the front and rear surfaces of a sheet.

To achieve the abovementioned object, an image formation system reflecting one aspect of the present invention includes: a first image forming apparatus; a sheet inversion section; a second image forming apparatus; an image density detection section; and an inter-apparatus density adjusting section; the first image forming apparatus including: a first photoconductor; a first charging section configured to charge a surface of the first photoconductor; a first light exposure section configured to irradiate the first photoconductor with light to form an electrostatic latent image; a first development section configured to supply developer to visualize the electrostatic latent image; a first image bearing member configured to bear a visualized toner image that is to be transferred to a first surface of a sheet; a first fixing section configured to fix a toner image transferred to a sheet; a first toner image density detection section configured to detect a density of a toner pattern borne on the first image bearing member; and a first density control section configured to control an image formation condition such that a detection result of the first toner image density detection section matches a first target control density determined by a first density control point; the sheet inversion section being disposed on a downstream side of the first image forming apparatus in a sheet conveyance direction, and configured to invert a sheet output from the first image forming apparatus; the second image forming apparatus being disposed on a downstream side of the sheet inversion section in the sheet conveyance direction, and including: a second photoconductor; a second charging section configured to charge a surface of the second photoconductor; a second light exposure section configured to irradiate the second photoconductor with light to form an electrostatic latent image; a second development section configured to supply developer to visualize the electrostatic latent image; a second image bearing member configured to bear a visualized toner image that is to be transferred to a second surface of a sheet; a second fixing section configured to fix a toner image transferred to a sheet; a second toner image density detection section configured to detect a density of a toner pattern borne on the second image bearing member; and a second density control section configured to control an image formation condition such that a detection result of the second toner image density detection section matches a second target control density determined by a second density control point; the image density detection section being disposed on a downstream side of the second image forming apparatus in the sheet conveyance direction, and configured to detect a density of a first pattern image for a highest density adjustment and a density of a second pattern image for a half-tone density adjustment, each of the first and second pattern images being formed on a sheet in each of the first image forming apparatus and the second image forming apparatus; the inter-apparatus density adjusting section being configured to correct the first density control point or the second density control point on a basis of a detection result of the first pattern image of the image density detection section, and to correct a light exposure energy of the first light exposure section or a light exposure energy of the second light exposure section on a basis of a detection result of the second pattern image, wherein the first density control section corrects the first density control point or the light exposure energy of the first light exposure section in accordance with a coverage rate of an image formed in the first image forming apparatus; and the second density control section corrects the second density control point or the light exposure energy of the second light exposure section in accordance with a coverage rate of an image formed in the second image forming apparatus.

In a density controlling method for an image formation system reflecting another aspect of the present invention the image formation system includes: a first image forming apparatus; a sheet inversion section; and a second image forming apparatus; the first image forming apparatus including: a first photoconductor; a first charging section configured to charge a surface of the first photoconductor; a first light exposure section configured to irradiate the first photoconductor with light to form an electrostatic latent image; a first development section configured to supply developer to visualize the electrostatic latent image; a first image bearing member configured to bear a visualized toner image that is to be transferred to a first surface of a sheet; a first fixing section configured to fix a toner image transferred to a sheet; and a first toner image density detection section configured to detect a density of a toner pattern borne on the first image bearing member; the first image forming apparatus being configured to control an image formation condition such that a detection result of the first toner image density detection section matches a first target control density determined by a first density control point; the sheet inversion section being disposed on a downstream side of the first image forming apparatus in a sheet conveyance direction, and configured to invert a sheet output from the first image forming apparatus; the second image forming apparatus being disposed on a downstream side of the sheet inversion section in the sheet conveyance direction, and including: a second photoconductor; a second charging section configured to charge a surface of the second photoconductor; a second light exposure section configured to irradiate the second photoconductor with light to form an electrostatic latent image; a second development section configured to supply developer to visualize the electrostatic latent image; a second image bearing member configured to bear a visualized toner image that is to be transferred to a second surface of a sheet; a second fixing section configured to fix a toner image transferred to a sheet; and a second toner image density detection section configured to detect a density of a toner pattern borne on the second image bearing member; the second image forming apparatus being configured to control an image formation condition such that a detection result of the second toner image density detection section matches a second target control density determined by a second density control point; the method including: detecting a density of a first pattern image for a highest density adjustment and a density of a second pattern image for a half-tone density adjustment, each of the first and second pattern images being formed on a sheet in each of the first image forming apparatus and the second image forming apparatus; correcting the first density control point or the second density control point on a basis of a detection result of the first pattern image of the image density detection section, and to correct a light exposure energy of the first light exposure section or a light exposure energy of the second light exposure section on a basis of a detection result of the second pattern image; correcting, in the first image forming apparatus, the first density control point or the light exposure energy of the first light exposure section in accordance with a coverage rate of an image formed in the first image forming apparatus, and correcting, in the second image forming apparatus, the second density control point or the light exposure energy of the second light exposure section in accordance with a coverage rate of an image formed in the second image forming apparatus.

BRIEF DESCRIPTION OF DRAWINGS

The present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

In the following, an embodiment of the present invention is described in detail with reference to the drawings.

Figure 1:
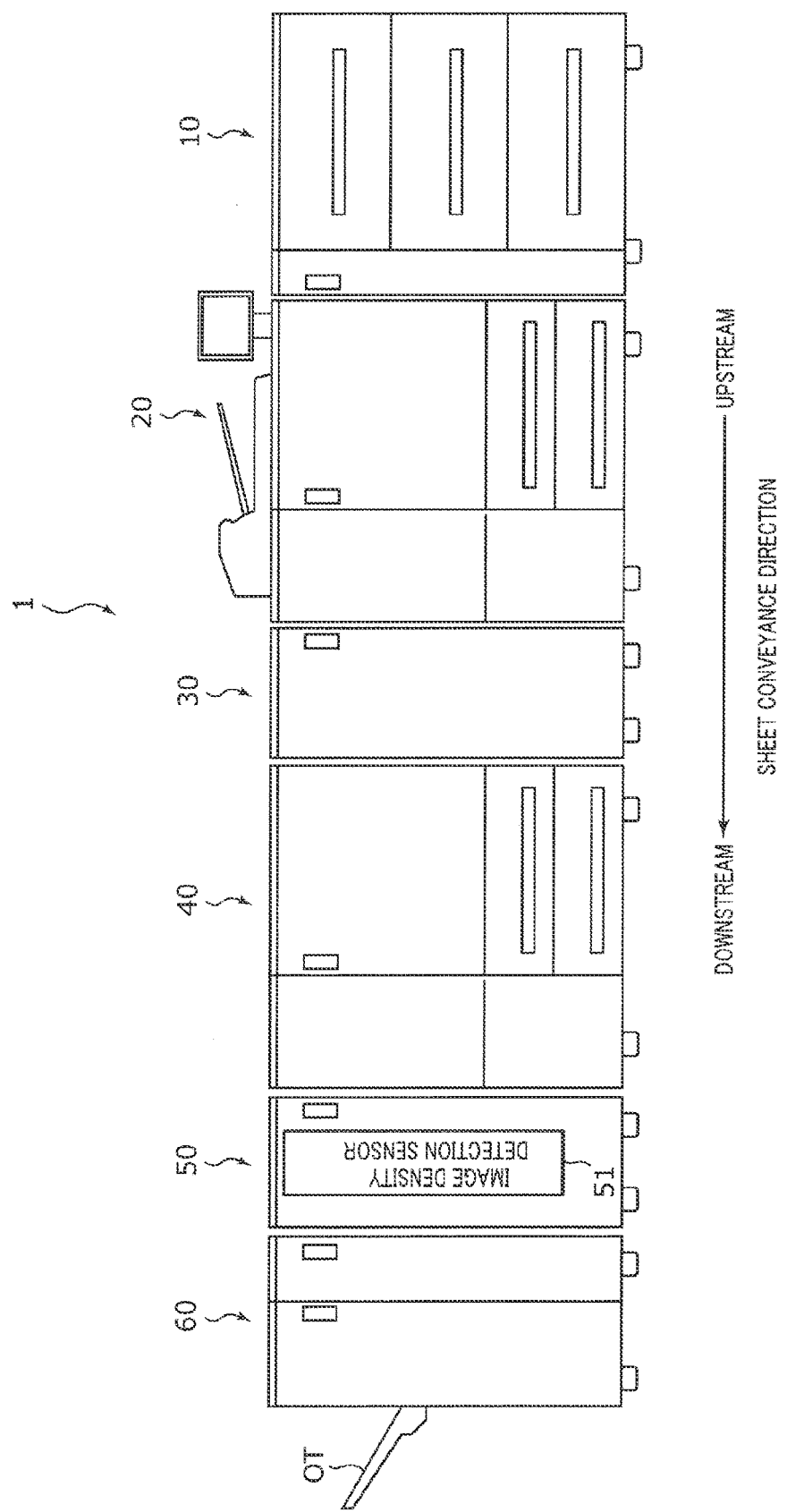
FIG. 1 illustrates an image formation system according to an embodiment of the present invention.

FIG. 1 illustrates image formation system 1 according to an embodiment of the present invention.

Image formation system 1 illustrated in FIG. 1 includes, in the order from the upstream side in the sheet conveyance direction, sheet feeding apparatus 10, first image forming apparatus 20 (upstream apparatus), sheet inversion apparatus 30, second image forming apparatus 40 (downstream apparatus), image density detection apparatus 50, and post-processing apparatus 60. That is, image formation system 1 is a tandem-type image formation system in which image forming apparatuses 20 and 40 in tandem are connected with each other. Here, first image forming apparatus 20 generally controls the processes in image formation system 1.

Sheet feeding apparatus 10 stores therein sheets (standard sheets, special sheets) discriminated on the basis of the basis weight, the size, and the like, for each type set in advance, and feeds sheets under the instruction of first image forming apparatus 20.

First image forming apparatus 20 forms an image on a first surface (front surface or rear surface) of a sheet fed thereto, and outputs the sheet to sheet inversion apparatus 30.

In the case of duplex image formation, sheet inversion apparatus 30 inverts the sheet on which an image is formed on its first surface, and outputs the sheet to second image forming apparatus 40. In second image forming apparatus 40, a second surface (rear surface or front surface) is used as the image formation surface. In the case of one-side image formation, sheet inversion apparatus 30 outputs the sheet to second image forming apparatus 40 without inverting the sheet. Alternatively, the sheet may be ejected to a paper tray (not illustrated) of sheet inversion apparatus 30.

In the case of duplex image formation, second image forming apparatus 40 forms an image on a second surface of the sheet, and outputs the sheet to image density detection apparatus 50. In the case of one-side image formation, second image forming apparatus 40 outputs the sheet to image density detection apparatus 50 without forming an image on the sheet.

Image density detection apparatus 50 is disposed on the downstream side of second image forming apparatus 40 in the sheet conveyance direction. Image density detection apparatus 50 includes image density detection sensor 51 that detects the density of an image formed on a sheet by first image forming apparatus 20 or second image forming apparatus 40. Image density detection sensor 51 is, for example, a reflection-type photodetector that includes a light emitting device such as a light-emitting diode (LED) and a photodetector such as a photodiode (PD), and detects the reflection intensity of a toner pattern.

When the reflectance detected by image density detection sensor 51 is represented by T, image density D is expressed by Expression (1).

$$D = +\log_{10} T \quad (1)$$

For example, when the reflectance is 10%, the image density is 1.0, and when the reflectance is 1%, the image density is 2.0.

Image density detection sensor 51 is used to adjust the density between first image forming apparatus 20 and second image forming apparatus 40. To be more specific, image density detection sensor 51 detects the density of a first pattern image for a highest density adjustment and a second pattern image for a half-tone density adjustment which are formed on a sheet in first image forming apparatus 20 and second image forming apparatus 40, in the inter-apparatus density adjusting process described later.

As necessary, post-processing apparatus 60 performs stapling, punching, and folding of sheets, and ejects the sheets to paper tray OT.

Figure 2:
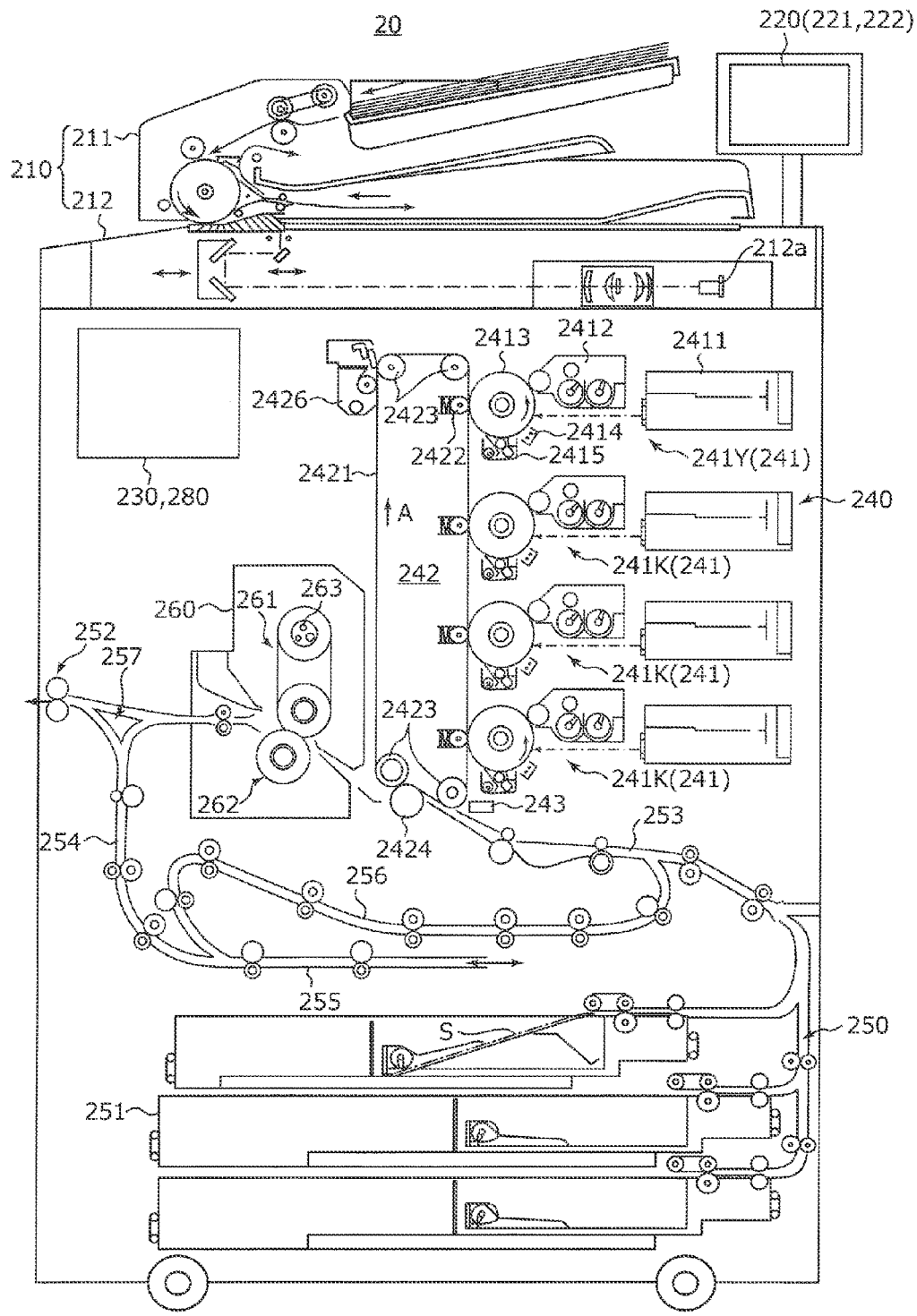
FIG. 2 illustrates a general configuration of a first image forming apparatus.
Figure 3:
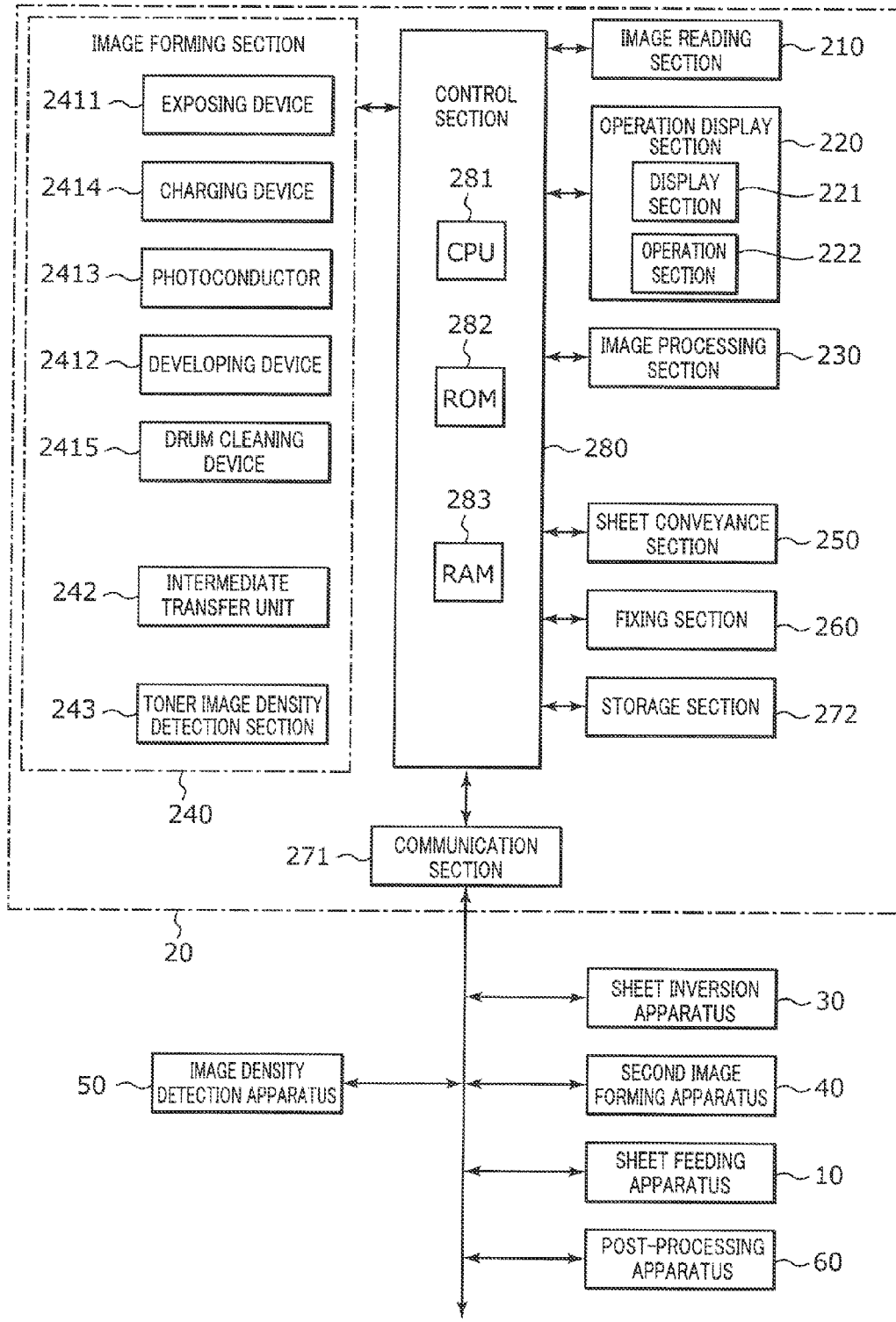
FIG. 3 illustrates a principal part of a control system of the first image forming apparatus.

FIG. 2 illustrates a general configuration of first image forming apparatus 20. FIG. 3 illustrates a principal part of a control system of first image forming apparatus 20.

First image forming apparatus 20 illustrated in FIGS. 2 and 3 is a color image forming apparatus of an intermediate transfer system using electrophotographic process technology. A longitudinal tandem system is adopted for first image forming apparatus 20. In the longitudinal tandem system, respective photoconductor drum 413 corresponding to the four colors of YMCK are placed in series in the travelling direction (vertical direction) of intermediate transfer belt 2421, and the toner images of the four colors are sequentially transferred to intermediate transfer belt 2421 in one cycle.

That is, first image forming apparatus 20 transfers (primary-transfers) toner images of yellow (Y), magenta (M), cyan (C), and black (K) formed on photoconductor drums 2413 to intermediate transfer belt 2421, and superimposes the toner images of the four colors on one another on intermediate transfer belt 2421. Then, first image forming apparatus 20 secondary-transfers the resultant image to a sheet, thereby forming an image.

As illustrated in FIGS. 2 and 3, first image forming apparatus 20 includes image reading section 210, operation display section 220, image processing section 230, image forming section 240, sheet conveyance section 250, fixing section 260, and control section 280.

Control section 280 includes central processing unit (CPU) 281, read only memory (ROM) 282, random access memory (RAM) 283 and the like. CPU 281 reads a program suited to processing contents out of ROM 282 or storage section 272, develops the program in RAM 283, and integrally controls operations of the blocks of first image forming apparatus 20 and operations of sheet feeding apparatus 10, sheet inversion apparatus 30, second image forming apparatus 40, image density detection apparatus 50, and post-processing apparatus 60, in cooperation with the developed program.

Communication section 271 has various interfaces such as network interface card (NIC), modulator-demodulator (MODEM), and universal serial bus (USB), for example. Storage section 272 is composed of, for example, a non-volatile semiconductor memory (so-called flash memory) or a hard disk drive. Storage section 272 stores therein a look-up table which is referenced when the operation of each block is controlled, for example.

Control section 280 transmits and receives various data to and from an external apparatus (for example, a personal computer) connected to a communication network such as a local area network (LAN) or a wide area network (WAN), through communication section 271. Control section 280 receives image data (input image data) of page description language (PDL) that has been sent from an external device, and controls the apparatus to form an image on a sheet on the basis of the data, for example. In addition, control section 280 performs transmission and reception of various data among sheet feeding apparatus 10, sheet inversion apparatus 30, second image forming apparatus 40, image density detection apparatus 50, and post-processing apparatus 60, through communication section 271.

Image reading section 210 includes an automatic document feeder 11 called auto document feeder (ADF), document image scanner (scanner) 212, and the like.

Auto document feeder 211 causes a conveyance mechanism to feed documents placed on a document tray, and sends out the documents to document image scanner 212. Auto document feeder 211 enables images (even both sides thereof) of a large number of documents placed on the document tray to be successively read at once.

Document image scanner 212 optically scans a document fed from auto document feeder 211 to its contact glass or a document placed on its contact glass, and images light reflected from the document on the light receiving surface of charge coupled device (CCD) sensor 212a, to thereby read the document image. Image reading section 210 generates input image data on the basis of a reading result provided by document image scanner 212. Image processing section 230 performs predetermined image processing on the input image data.

Operation display section 220 includes, for example, a liquid crystal display (LCD) with a touch panel, and functions as display section 221 and operation section 222. Display section 221 displays various operation screens, image conditions, operating statuses of functions, and the like in accordance with display control signals received from control section 280. Operation section 222 includes various operation keys such as numeric keys and a start key, receives various input operations performed by a user, and outputs operation signals to control section 280.

By operating operation display section 220, the user can perform setting relating to the image formation such as document setting, image quality setting, multiplying factor setting, application setting, output setting, single-sided/duplex printing setting, sheet setting, and translation amount adjustment, and can execute an inter-apparatus density adjusting process for performing an initial image density control (density adjusting mode).

Image processing section 230 includes a circuit that performs a digital image process suited to initial settings or user settings on the input image data, and the like. For example, image processing section 230 performs tone correction on the basis of tone correction data (tone correction table), under the control of control section 280. Image processing section 230 also performs various correction processes such as color correction and shading correction as well as a compression process, on the input image data. Image forming section 240 is controlled on the basis of the image data that has been subjected to these processes.

Image forming section 240 includes: image forming units 241 for images of colored toners respectively containing a Y component, an M component, a C component, and a K component on the basis of the input image data; intermediate transfer unit 242; and the like.

Image forming unit 241 includes image forming units 241Y, 241M, 241C, and 241K for the Y component, the M component, the C component, and the K component, respectively. Image forming units 241Y, 241M, 241C, and 241K for the Y component, the M component, the C component, and the K component have a similar configuration. For ease of illustration and description, common elements are denoted by the same reference signs. Only when elements need to be discriminated from one another, Y, M, C, or K is added to their reference signs. In FIG. 1, reference signs are given to only the elements of image forming unit 241Y for the Y component, and reference signs are omitted for the elements of other image forming units 241M, 241C, and 241K.

Image forming unit 241 includes exposing device 2411, developing device 2412, photoconductor drum 2413, charging device 2414, drum cleaning device 2415 and the like.

Photoconductor drum 2413 is, for example, a negative-charge-type organic photoconductor (OPC) formed by sequentially laminating an under coat layer (UCL), a charge generation layer (CGL), and a charge transport layer (CTL) on the circumferential surface of a conductive cylindrical body (aluminum-elementary tube) made of aluminum.

The charge generation layer is made of an organic semiconductor in which a charge generating material (for example, phthalocyanine pigment) is dispersed in a resin binder (for example, polycarbonate), and generates a pair of positive charge and negative charge through light exposure by exposure device 2411. The charge transport layer is made of a layer in which a hole transport material (electron-donating nitrogen compound) is dispersed in a resin binder (for example, polycarbonate resin), and transports the positive charge generated in the charge generation layer to the surface of the charge transport layer.

Charging device 2414 is composed of a corona discharging generator such as a scorotron charging device and a corotron charging device, for example. Charging device 2414 evenly negatively charges the surface of photoconductor drum 2413 by corona discharge.

Exposing device 2411 is composed of, for example, an LED print head including an LED array in which a plurality of LEDs are linearly laid out, an LPH driving section (driver IC) for driving each LED, and an lens array that brings light radiated from the LED array into an image on photoconductor drum 2413, and the like. Each of the LEDs of LED array 1 corresponds to one dot of an image. Control section 280 controls the LPH driving section to cause a predetermined driving current to flow through the LED array, and thus designated LEDs emit light.

Exposure device 2411 irradiates photoconductor drum 2413 with light corresponding to the image of each color component. The positive charge generated in the charge generation layer of photoconductor drum 2413 is transported to the surface of the charge transport layer, whereby the surface charge (negative charge) of photoconductor drum 2413 is neutralized. Thus, an electrostatic latent image of each color component is formed on the surface of photoconductor drum 2413 by the potential difference from its surroundings.

Developing device 2412 stores developers of respective color components (for example, two-component developers composed of toner and magnetic carrier). Developing device 2412 attaches the toners of respective color components to the surface of photoconductor drum 2413, and thus visualizes the electrostatic latent image to form a toner image. To be more specific, a developing bias voltage is applied to a developer bearing member (developing roller), and, by the potential difference between the surface of photoconductor drum 2413 and the developer bearing member, the charged toner on the developer bearing member is moved and attached to a light-exposed part on the surface of photoconductor drum 2413.

Drum cleaning device 2415 includes a drum cleaning blade that is brought into sliding contact with the surface of photoconductor drum 2413, and removes residual toner that remains on the surface of photoconductor drum 2413 after the primary transfer.

Intermediate transfer unit 242 includes intermediate transfer belt 2421, primary transfer roller 2422, a plurality of support rollers 2423, secondary transfer roller 2424, belt cleaning device 2426 and the like.

Intermediate transfer belt 2421 is composed of an endless belt, and is stretched around the plurality of support rollers 2423 in a loop form. At least one of the plurality of support rollers 2423 is composed of a driving roller, and the others are each composed of a driven roller. Preferably, for example, support roller 2423 disposed on the downstream side in the belt travelling direction relative to primary transfer support rollers 2422 for K-component is a driving roller. When driving roller rotates, intermediate transfer belt 2421 travels in arrow A direction at a constant speed.

Primary transfer rollers 2422 are disposed on the inner periphery side of intermediate transfer belt 2421 in such a manner as to face photoconductor drums 2413 of respective color components. Primary transfer rollers 2422 are brought into pressure contact with photoconductor drums 2413 with intermediate transfer belt 2421 therebetween, whereby a primary transfer nip for transferring a toner image from photoconductor drums 2413 to intermediate transfer belt 2421 is formed.

Secondary transfer roller 2424 is disposed on the outer periphery side of intermediate transfer belt 2421 in such a manner as to face one of support rollers 2423. Support roller 2423 that is so disposed as to face intermediate transfer belt 2421 is called "backup roller." Secondary transfer roller 2424 is brought into pressure contact with the backup roller with intermediate transfer belt 2421 therebetween, whereby a secondary transfer nip for transferring a toner image from intermediate transfer belt 2421 to a sheet is formed.

When intermediate transfer belt 2421 passes through the primary transfer nip, the toner images on photoconductor drums 2413 are sequentially primary-transferred to intermediate transfer belt 2421. To be more specific, a primary transfer bias is applied to primary transfer rollers 2422, and electric charge of the polarity opposite to the polarity of the toner is applied to the rear side (the side that makes contact with primary transfer rollers 2422) of intermediate transfer belt 2421, whereby the toner image is electrostatically transferred to intermediate transfer belt 2421.

Thereafter, when the sheet passes through the secondary transfer nip, the toner image on intermediate transfer belt 2421 is secondary-transferred to the sheet. To be more specific, a secondary transfer bias is applied to secondary transfer roller 2424, and an electric charge opposite to that of the toner is applied to the rear side (the side that makes contact with secondary transfer roller 2424) of the sheet, whereby the toner image is electrostatically transferred to the sheet. The sheet on which the toner image has been transferred is conveyed toward fixing section 260.

Belt cleaning device 2426 includes a belt cleaning blade configured to make sliding contact with the surface of intermediate transfer belt 2421, and the like, and removes transfer residual toner remaining on the surface of intermediate transfer belt 2421 after the secondary transfer.

Alternatively, in intermediate transfer unit 242, it is also possible to adopt a configuration (so-called belt-type secondary transfer unit) in which a secondary transfer belt is installed in a stretched state in a loop form around a plurality of support rollers including a secondary transfer roller in place of secondary transfer roller 2424.

Fixing section 260 includes upper fixing section 261 having a fixing side member disposed on a fixing surface (the surface on which a toner image is formed) side of a sheet, lower fixing section 262 having a back side supporting member disposed on the rear surface (the surface opposite to the fixing surface) side of the sheet, heating source 263 configured to heat the fixing side member, and the like.

When upper side fixing section 261 is of a belt heating type (see FIG. 1), the fixing belt serves as the fixing side member, and when upper side fixing section 261 is of a roller heating type, the fixing roller serves as the fixing side member. In addition, when lower side fixing section 262 is of a roller pressing type (see FIG. 1), the pressure roller serves as the back side supporting member, and when lower side fixing section 262 is of a belt pressing type, the pressing belt serves as the back side supporting member. The back side supporting member is brought into pressure contact with the fixing side member, whereby a fixing nip for conveying a sheet in a tightly sandwiching manner is formed. A toner image is secondary-transferred, and heat and pressure are applied to a sheet at the time when the sheet passes through the nip portion. Thus, the toner image is fixed to the sheet. In addition, fixing section 260 may include a separation air blowing section configured to apply air to the fixing side member or the back side supporting member to thereby separate a sheet from the fixing side member or the back side supporting member.

Sheet conveyance section 250 includes sheet feeding section 251, sheet ejection section 252, first to fourth conveyance sections 253 to 256, conveyance path switching section 257 and the like. Sheets (including standard type sheets and special type sheets) discriminated on the basis of their weight, size and the like are stored on a predetermined type basis in respective sheet tray units (in FIG. 1, three sheet tray units) of sheet feeding section 251.

First conveyance section 253 has a plurality of conveyance roller sections including an intermediate conveyance roller section, a loop roller section and a registration roller section. First conveyance section 253 conveys a sheet fed from sheet feeding section 251, or sheet feeding apparatus 10 to image forming section 240 (secondary transfer section).

Second conveyance section 254 conveys to third conveyance section 255 a sheet on which an image is formed on its first surface in image forming section 240. In addition, second conveyance section 254 conveys to sheet ejection section 252 a sheet output from third conveyance section 255.

Third conveyance section 255 temporarily stops a sheet output from second conveyance section 254, and reverses the conveyance direction (switch back). Third conveyance section 255 conveys the switchbacked sheet to second conveyance section 254 or fourth conveyance section 256.

Fourth conveyance section 256 is a circulation path that conveys a sheet which is output from third conveyance section 255 to first conveyance section 253 (to the upstream of the loop roller section). A sheet whose second surface (rear surface) faces upward passes through first conveyance section 253.

Conveyance path switching section 257 switches the conveyance paths according to whether a sheet output from fixing section 260 is to be ejected as it is, or is to be inverted before being ejected. To be more specific, control section 280 controls the operation of conveyance path switching section 257 on the basis of the processing detail of the image formation process (one-side/both-side printing, sheet type, and the like).

The sheet fed from sheet feeding section 251 or sheet feeding device 10 is conveyed to image forming section 240 by first conveyance section 253. Thereafter, a toner image on intermediate transfer belt 2421 is secondary-transferred to a first surface of the sheet at one time at the time when the sheet passes through the transfer nip, and then a fixing process is performed in fixing section 260. The sheet on which an image has been formed is ejected toward sheet inversion apparatus 30 by sheet ejection section 252 provided with a sheet discharging roller and the like.

It is also possible to form an image in first image forming apparatus 20 on a second surface of a sheet on which an image has been formed on its first surface by conveying the sheet in a circulating manner by second conveyance section 254 to fourth conveyance section 256.

In addition, in first image forming apparatus 20, toner image density detection section 243 that detects the image density of the toner pattern formed on intermediate transfer belt 2421 is disposed. Toner image density detection section 243 is disposed in a region on the downstream side relative to the primary transfer nip and on the upstream side relative to the secondary transfer nip in the belt travelling direction, such that toner image density detection section 243 faces the outer peripheral surface of intermediate transfer belt 2421, for example.

As toner image density detection section 243, a reflection-type photodetector that includes a light emitting device such as a light-emitting diode (LED) and a photodetector such as a photodiode (PD), and detects the reflection intensity of a toner pattern may be adopted. In addition, in the case where intermediate transfer belt 2421 is made of a light transmissive material, it is possible to adopt, as toner image concentration detector 243, a transmission-type photodetector in which a light emitting device and a photodetector are disposed in facing relation with intermediate transfer belt 2421 therebetween. In general, light sensors that detect the density of a toner pattern are called IDC sensors.

In first image forming apparatus 20, an image density control is performed on the basis of detection results obtained by toner image density detection section 243. To be more specific, in the intervals between sheets (between images) in a printing job for continuously forming a plurality of images, a toner pattern having a highest density is formed on intermediate transfer belt 2421, and the density of the toner pattern (toner adhesion amount) is detected by toner image density detection section 243. Here, the toner pattern having a highest density is a solid image formed of toner attached in the entirety of a predetermined region greater than a detection region of toner image density detection section 243.

The image formation condition (density control parameter) including the light exposure energy (light exposure time or light exposure output) of first exposing device 2411, the charging voltage of first charging device 2414, the developing bias voltage and the rotational frequency of the developing roller of first developing device 2412, and the like is controlled such that the detection result (density of toner pattern) of toner image density detection section 243 matches the target control density.

Of the above-mentioned image formation conditions, the rotational frequency of the developing roller of first developing device 2412 is controlled in the image density control of the present embodiment. For example, when the density of the toner pattern of the highest density is lower than the target control density (toner adhesion amount is small), the developing roller is controlled to increase the rotational frequency of the developing roller, and when the density of the toner pattern of the highest density is higher than the target control density (toner adhesion amount is large), the developing roller is controlled to reduce the rotational frequency of the developing roller. In this manner, the toner adhesion amount on photoconductor drum 2413, that is, the density of the toner pattern of the highest density, is maintained at a constant value.

The target control density is determined by the level of the density control points which are previously set in a stepwise manner. The density control points are set in a range of +3 to −5, with a reference level of "0," for example. As the level of the density control point increases, the target control density increases, and as the level of the density control point decreases, the target control density decreases. Here, it is assumed that the target control density is 1.55 (which corresponds to reflectance of 2.8%) when the density control point is set at the reference level.

In the following description, the density control point of first image forming apparatus 20 is referred to as "first density control point D1," and the target control density determined by first density control point D1 is referred to as "first target control density." The setting level of first density control point D1 is stored in first storage section 272 for example.

As described, first image forming apparatus 20 includes: first photoconductor drum 2413 (first photoconductor); first charging device 2414 (first charging section) configured to charge a surface of first photoconductor drum 2413; first exposing device 2411 (first light exposure section) configured to irradiate first photoconductor drum 2413 with light to form an electrostatic latent image; first developing device 2412 (first development section) configured to supply developer to visualize an electrostatic latent image; first intermediate transfer belt 2421 (first image bearing member) configured to bear a visualized toner image that is to be transferred to a first surface of a sheet; first fixing section 260 configured to fix a toner image transferred to a sheet; first toner image density detection section 243 configured to detect a density of a toner pattern borne on first intermediate transfer belt 2421; and first control section 280 (first density control section) configured to control an image formation condition such that a detection result of first toner image density detection section 243 matches a first target control density determined by first density control point D1.

Figure 4:
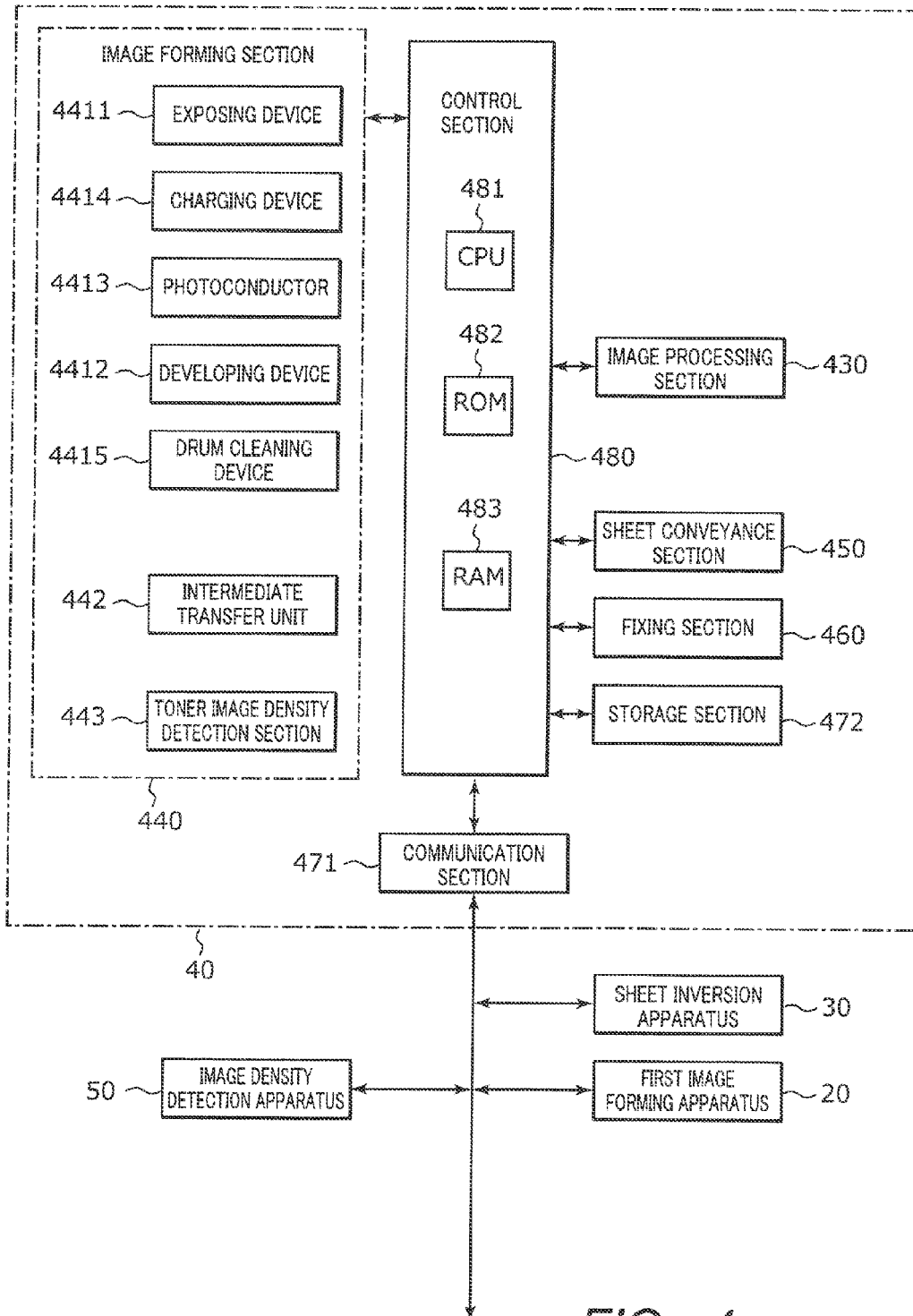
FIG. 4 illustrates a principal part of a control system of a second image forming apparatus.

FIG. 4 illustrates a principal part of a control system of second image forming apparatus 40. The configuration of second image forming apparatus 40 is substantially similar to that of first image forming apparatus 20. The components corresponding to those of first image forming apparatus 20 are each denoted by a reference numeral whose prefix number (in first image forming apparatus 20, "2") is replaced by "4." In the following description, the components common to first image forming apparatus 20 and second image forming apparatus 40 are referred to as "first . . . (for example, first fixing section 260)", or "second . . . (for example, second fixing section 460)," for example. In addition, when the components common to first image forming apparatus 20 and second image forming apparatus 40 are not discriminated, the components are simply denoted by their name (for example, fixing sections 260 and 460).

Through second communication section 471, second control section 480 transmits and receives various kinds of data to and from first image forming apparatus 20 and the like. On the basis of the instruction of first control section 280, second control section 480 controls the operations of second image processing section 430, second image forming section 440, second sheet conveyance section 450, second fixing section 460 and the like, thereby forming an image on the second surface of a sheet.

As with first image forming apparatus 20, in second image forming apparatus 40, toner image density detection section 443 that detects the density of the toner pattern formed on intermediate transfer belt 4421 is disposed. In second image forming apparatus 40, an image density control is performed on the basis of the detection results obtained by toner image density detection section 443. The image density control in second image forming apparatus 40 is performed in a manner similar to that of first image forming apparatus 20.

In the following description, the density control point of second image forming apparatus 40 is referred to as "second density control point D2," and the target control density determined by second density control point D2 is referred to as "second target control density." The setting level of second density control point D2 is stored in second storage section 472 for example.

As described, second image forming apparatus 40 includes: second photoconductor drum 4413 (second photoconductor); second charging device 4414 (second charging section) configured to charge a surface of second photoconductor drum 4413; second exposing device 4411 (second light exposure section) configured to irradiate second photoconductor drum 4413 with light to form an electrostatic latent image; second developing device 4412 (second development section) configured to supply developer to visualize an electrostatic latent image; second intermediate transfer belt 4421 (second image bearing member) configured to bear a visualized toner image that is to be transferred to a second surface of a sheet; second fixing section 460 configured to fix a toner image transferred to a sheet; second toner image density detection section 443 configured to detect a density of a toner pattern borne on second intermediate transfer belt 4421; and second control section 480 (second density control section) configured to control an image formation condition such that a detection result of second toner image density detection section 443 matches a second target control density determined by second density control point D2.

As described above, in image formation system 1, the image density control is performed in each of first image forming apparatus 20 and second image forming apparatus 40. However, the output performances of toner image density detection section 243 of first image forming apparatus 20 and toner image density detection section 443 of second image forming apparatus 40 may possibly be different from each other.

Therefore, even when first density control point D1 and second density control point D2 are set at the same level and the image density control is performed on the basis of the level, the densities of the images actually formed on a sheet may not be equal to each other. As a result, a density difference is caused between the front and rear surfaces of the sheet, and thus the quality of the images may be different between the front and rear surfaces.

In the present embodiment, a first pattern image for a highest density adjustment is formed on a sheet in each of first image forming apparatus 20 and second image forming apparatus 40, and densities of the images are detected by image density detection sensor 51. Then, on the basis of the detection result, first density control point D1 or second density control point D2 is corrected. As the first pattern image, a solid image formed of toner attached in the entirety of a predetermined region greater than a detection region of image density detection sensor 51 is used.

Further, a second pattern image for a half-tone density adjustment is formed on a sheet in each of first image forming apparatus 20 and second image forming apparatus 40, and image densities of the images are detected by image density detection sensor 51. Then, on the basis of the detection result, the light exposure time of first exposing device 2411 (hereinafter referred to as "first light exposure time T1") or the light exposure time of second exposing device 4411 (hereinafter referred to as "second light exposure time T2") is corrected. As the second pattern image, a halftone image which is formed of toner partially attached in a predetermined region greater than a detection region of toner image density detection section 243, and is formed in a predetermined dot pattern is used.

Figure 5:
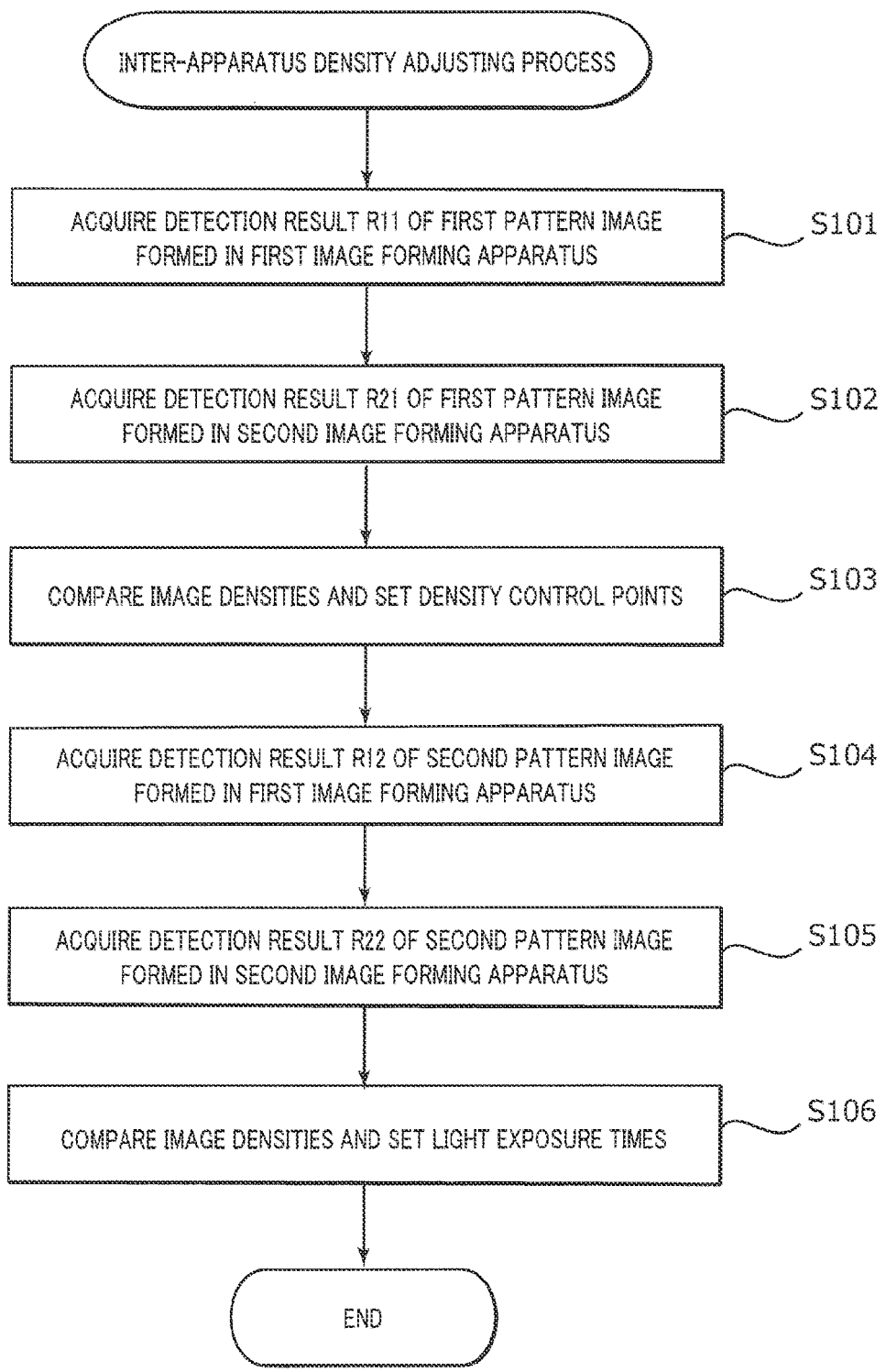
FIG. 5 is a flowchart illustrating an exemplary inter-apparatus density adjusting process in the image formation system.

To be more specific, through an inter-apparatus density adjusting process illustrated in FIG. 5, first density control point D1 and first light exposure time T1 in first image forming apparatus 20, and second density control point D2 and second light exposure time T2 in second image forming apparatus 40 are set.

FIG. 5 is a flowchart illustrating an exemplary inter-apparatus density adjusting process in image formation system 1. The inter-apparatus density adjusting process is achieved when, in first image forming apparatus 20, CPU 281 of first control section 280 serving as an inter-apparatus adjusting section executes a predetermined program stored in ROM 282 in response to an operation for executing a density adjusting mode, for example. It is to be noted that the setting in second image forming apparatus 40 is executed by second control section 480 on the basis of the instruction of first control section 280.

To simplify the description, it is assumed that first density control point D1 and second density control point D2 are set at the reference level "0" in the initial state, and the target control density is 1.55, and that the intended image density (target image density) of the first pattern image for the highest density adjustment formed on a sheet is also 1.55. In addition, it is assumed that the target image density of the second pattern image for the half-tone density adjustment formed on a sheet is 0.80.

At step S101 of FIG. 5, first control section 280 controls first image forming apparatus 20 to form a first pattern image (solid image) for the highest density adjustment on a sheet, and acquires detection result R11 of image density detection sensor 51. At this time, sheet inversion of sheet inversion apparatus 30 is not performed, and the sheet on which the first pattern image is formed is conveyed through sheet image density detection apparatus 50, with a first surface of the sheet facing image density detection sensor 51.

While, in first image forming apparatus 20, the image density control is performed such that the density of the toner pattern of the highest density formed on intermediate transfer belt 2421 is the first target control density (=1.55), the density of the first pattern image (detection result R11 of image density detection sensor 51) formed on sheets may not always be 1.55.

At step S102, first control section 280 controls second image forming apparatus 20 to form a first pattern image for the highest density adjustment on a sheet, and acquires detection result R21 of image density detection sensor 51.

While, also in second image forming apparatus 20, the image density control is performed such that the density of the toner pattern of the highest density formed on intermediate transfer belt 4421 is the second target control density (=1.55), the density of the first pattern image formed on sheets (detection result R21 of image density detection sensor 51) may not always be 1.55.

At step S103, first control section 280 compares detection result R11 acquired in step S101 with detection result R21 acquired in step S102, and sets first density control point D1 and second density control point D2 such that detection results R11 and R21 are equal to each other. To be more specific, when detection result R11 or R21 of the first pattern image for the highest density adjustment is greater than the target image density of 1.55, first density control point D1 or second density control point D2 is corrected to a level (−side) that reduces the density relative to the current level. In addition, when detection result R11 or R21 is smaller than the target image density of 1.55, first density control point D1 or second density control point D2 is corrected to a level (+side) that increases the density relative to the current level. When first density control point D1 is corrected, the rotational frequency of the developing roller of first developing device 2413 is changed in accordance with the level of corrected first density control point D1. In addition, when the second density control point D2 is corrected, the rotational frequency of the developing roller of second developing device 4412 is changed in accordance with the level of corrected second density control point D2.

In the case where the target image density is not set, it is only necessary to correct first density control point D1 or second density control point D2 such that detection results R11 and R12 are equal to each other.

Through the processes of steps S101 to S103, the density of the solid image formed in first image forming apparatus 20 and the density of the solid image formed in second image forming apparatus 40 are equalized. In this state, the half-tone density adjustment is performed.

At step S104 of FIG. 5, first control section 280 controls first image forming apparatus 20 to form a second pattern image (halftone image) for the half-tone density adjustment on a sheet, and acquires detection result R12 of image density detection sensor 51. At this time, sheet inversion of sheet inversion apparatus 30 is not performed, and the sheet on which the second pattern image is formed is conveyed through sheet image density detection apparatus 50, with the first surface of the sheet facing image density detection sensor 51.

At step S105, first control section 280 controls second image forming apparatus 40 to form a second pattern image for the half-tone density adjustment on a sheet, and acquires detection result R22 of second pattern image of image density detection sensor 51.

At step S106, first control section 280 compares detection result R12 acquired in step S104 with detection result R22 acquired in step S105, and sets first light exposure time T1 or second light exposure time T2 such that detection results R12 and R22 are equal to each other. To be more specific, when detection result R12 or R22 of the second pattern image for the half-tone density adjustment is greater than the target image density of 0.80, first light exposure time T1 or second light exposure time T2 is set to a value smaller than the current value. In addition, when detection result R12 or R22 is smaller than the target image density of 0.80, first light exposure time T1 or second light exposure time T2 is set to a value greater than the current value.

Through the processes of steps S104 to S106, the density of the halftone image formed in first image forming apparatus 20 and the density of the halftone image formed in second image forming apparatus 40 are equalized. It can be said that the density of the solid image is not influenced by the correction of first light exposure time T1 and second light exposure time T2 (or that the target image density is acquired). In the following description, the light exposure time set in the inter-apparatus density adjusting process is referred to as "reference light exposure time."

As described, image formation system 1 according to the present embodiment includes: first image forming apparatus 20; sheet inversion apparatus 30 (sheet inversion section) disposed on a downstream side of first image forming apparatus 20 in the sheet conveyance direction, and configured to invert a sheet output from first image forming apparatus 20; second image forming apparatus 40 disposed on a downstream side of sheet inversion apparatus 30; and image density detection sensor 51 (image density detection section) disposed on a downstream side of second image forming apparatus 40, and configured to detect a density of a first pattern image (solid image) for a highest density adjustment and a density of a second pattern image (halftone image) for a half-tone density adjustment, each of the first and second pattern images being formed on a sheet in each of first image forming apparatus 20 and second image forming apparatus 40.

First control section 280 serving as the inter-apparatus density adjusting section corrects first density control point D1 or second density control point D2 on the basis of detection results R11 and R21 of the first pattern image of image density detection sensor 51, and corrects first light exposure time T1 (light exposure energy of first exposing device 2411) or second light exposure time T2 (light exposure energy of second exposing device 4411) on the basis of detection results R21 and R22 of the second pattern image.

In this manner, the density of the image formed in first image forming apparatus 20, and the density of the image formed in second image forming apparatus 40 are equalized, and the density difference between front and rear surfaces is not caused. Consequently, the image density can be stabilized between the front and rear surfaces of a sheet.

Incidentally, as in first image forming apparatus 20 and second image forming apparatus 40, when two-component developer is used, the density difference between the front and rear surfaces of a sheet may be gradually caused even when the inter-apparatus density adjusting process is performed in the above-mentioned manner. One reason for this is that the difference in the consumption amount of toner, or in other words, the difference in the amount of toner to be supplied, is caused due to the difference in the coverage rate of the original image data, thus changing the development performance.

For example, when image formation is continuously performed at a low coverage rate, the retention time of toner in developing devices 2412 and 4412 is prolonged, and removal and bury of additive that is used for ensuring the transfer performance of the toner are facilitated. Consequently, development performance (fluidity and transfer rate of developer) is degraded, and the density of the image on a sheet is reduced with time.

In addition, for example, when image formation is continuously performed at a high coverage rate, the toner consumption amount is large, and a large amount of toner is supplied to developing devices 2412 and 4412. Thus, the retention time and the agitation time of toner in developing devices 2412 and 4412 are short, and consequently the charging amount of the toner is reduced. In such a case, even when the same target image density is used, the line width increases, and the halftone density increases.

Figure 6:
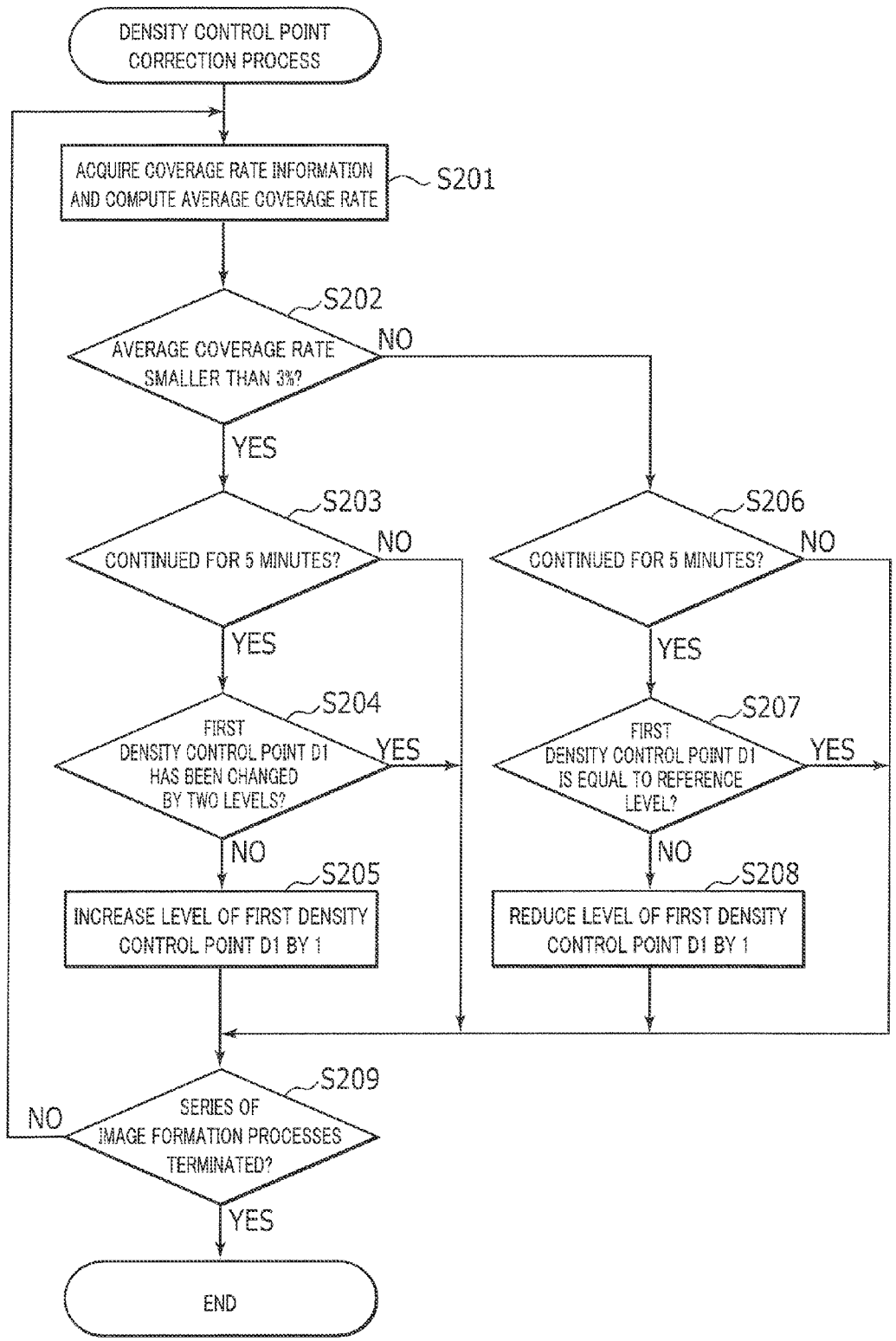
FIG. 6 is a flowchart illustrating an exemplary density control point correction process in the first image forming apparatus.
Figure 7:
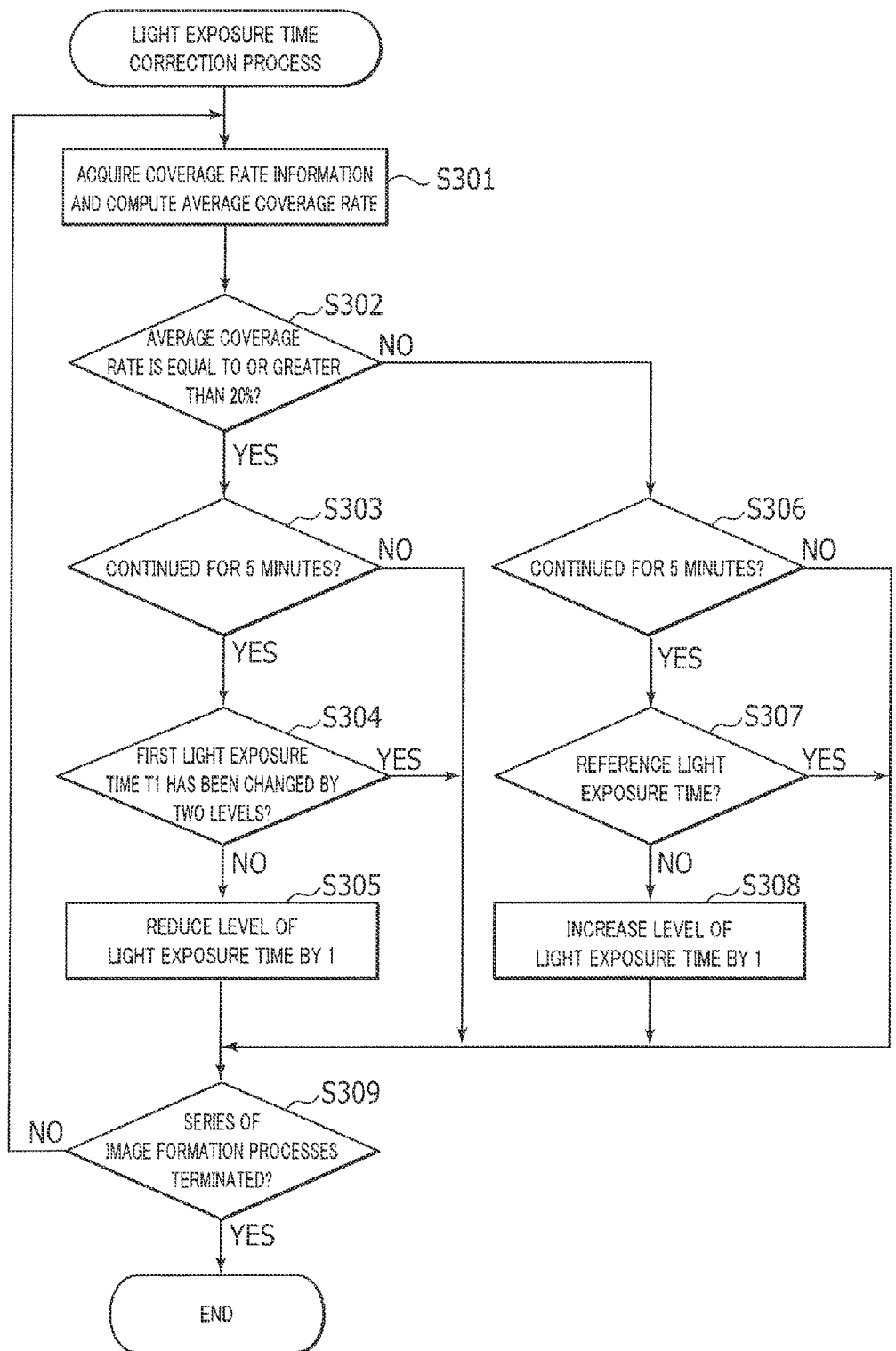
FIG. 7 is a flowchart illustrating an exemplary light exposure time correction process in the first image forming apparatus.

For this reason, the density control point correction process illustrated in FIG. 6 and the light exposure time correction process illustrated in FIG. 7 are performed in each of first image forming apparatus 20 and second image forming apparatus 40 so that the image density on a sheet does not change with time.

FIG. 6 is a flowchart illustrating an exemplary density control point correction process in first image forming apparatus 20. This process is achieved when CPU 281 of first control section 280 executes a predetermined program stored in ROM 282 upon the start of an image formation process in image formation system 1, for example.

To simplify the description, it is assumed that an initial level of first density control point D1 is set at the reference level "0" after the inter-apparatus density adjusting process illustrated in FIG. 5.

At step S201 of FIG. 6, first control section 280 acquires coverage rate information of an image formed in a predetermined time (15 seconds) in first image forming apparatus 20, and computes the average coverage rate. While the coverage rate information is preferably acquired from image data included in a printing job, the coverage rate information may also be acquired from the light exposure of first exposing device 2411 which is controlled on the basis of the image data and the like.

At step S202, first control section 280 determines whether the average coverage rate is smaller than the first coverage rate (for example, 3%). When the average coverage rate is smaller than 3% ("YES" at step S202), the process is advanced to step S203. When the average coverage rate is not smaller than 3% ("NO" at step S202), that is, when the average coverage rate is 3% or greater, the process is advanced to step S206.

When the state of the average coverage rate is not changed, the duration is integrated, and when the state of the average coverage rate is changed, the duration before the change is cleared.

At step S203, first control section 280 determines whether the duration during which the average coverage rate is smaller than 3% has reached a predetermined time (for example, 5 minutes), that is, determines whether a state where the average coverage rate is smaller than 3% has been continued for 5 minutes.

When the duration during which the average coverage rate is smaller than 3% has reached 5 minutes ("YES" at step S203), the process is advanced to step S204. Specifically, since images having a low coverage rate have been continuously formed, the development performance may possibly be lowered, and consequently the image density may possibly be reduced, and therefore first density control point D1 is corrected as necessary. On the other hand, when the duration during which the average coverage rate is smaller than 3% has not reached 5 minutes ("NO" at step S203), the process is advanced to step S209.

At step S204, first control section 280 determines whether first density control point D1 has already been changed by two levels, that is, whether the level of first density control point D1 is "+2." When first density control point D1 has already been changed by two levels ("YES" at step S204), the process is advanced to step S209. That is, when the level of first density control point D1 is "+2," first density control point D1 is not further corrected. On the other hand, when first density control point D1 is not yet changed by two levels ("NO" at step S204), that is, when the level of first density control point D1 is "0" or "+1," the process is advanced to step S205.

At step S205, first control section 280 increases the level of first density control point D1 by one level. At this point of time, the duration during which the average coverage rate is smaller than 3% is once cleared. For example, when a state where the average coverage rate is smaller than 3% is continued for 5 minutes, the level is set to "+1," and when the state is further continued for 5 minutes, the level is set to "+2." Since the target control density increases, the rotational frequency of the developing roller of first developing device 2412 increases.

At step S206, first control section 280 determines whether the duration during which the average coverage rate is 3% or greater has reached a predetermined time (for example, 5 minutes), that is, whether a state where the average coverage rate is 3% or greater has been continued for 5 minutes.

When the duration during which the average coverage rate is 3% or greater has reached 5 minutes ("YES" at step S206), the process is advanced to step S207. It is expected that, since images having an average coverage rate have been continuously formed, the development performance is maintained, or the development performance is restored, and therefore, first density control point D1 is corrected as necessary. On the other hand, when the duration during which the average coverage rate is 3% or greater has not reached 5 minutes ("NO" at step S206), the process is advanced to step S209.

At step S207, first control section 280 determines whether first density control point D1 is equal to the initial level (reference level). When first density control point D1 is equal to the initial level ("YES" at step S207), the process is advanced to step S209. When first density control point D1 is not equal to the initial level ("NO" at step S207), that is, when the level of first density control point D1 is "+1" or "+2," the process is advanced to step S208.

At step S208, first control section 280 lowers the level of first density control point D1 by one level. At this point of time, the duration during which the average coverage rate is 3% or greater is once cleared. For example, when a state where the average coverage rate is 3% or greater is continued for 5 minutes after a state where the average coverage rate is smaller than 3% is continued for 5 minutes and the level is set to "+1," the level is reset to the reference level "0." Since the target control density decreases, the rotational frequency of the developing roller of first developing device 2414 decreases.

At step S209, first control section 280 determines whether a series of image formation processes have been completed. The series of image formation processes are processes for forming an image based on a signal requesting image formation (for example, printing job). When the series of image formation processes have been completed ("YES" at step S209), the density control point correction process is terminated, and when the series of image formation processes have not been completed ("NO" at step S209), the processes subsequent to step S201 are repeated.

A density control point correction process as mentioned above is performed also in second image forming apparatus 40. As described, in the present embodiment, first density control point D1 in first image forming apparatus 20 and second density control point D2 in second image forming apparatus 40 are corrected on the basis of the coverage rate of the continuously formed images.

To be more specific, when the average coverage rate of a predetermined number of images continuously formed in first image forming apparatus 20 is continuously smaller than the first coverage rate (for example, 3%) for a predetermined period (for example, 5 minutes), first density control point D1 is set to a value higher than the current value. In addition, when the average coverage rate of a predetermined number of images continuously formed in second image forming apparatus 40 is continuously smaller than the first coverage rate (for example, 3%) for a predetermined period (for example, 5 minutes), second density control point D2 is set to a value higher than the current value.

In this manner, it is possible to prevent development performance from being degraded when images having a low coverage rate are continuously formed in first image forming apparatus 20 or second image forming apparatus 40. Thus, a density difference which is gradually caused between the front and rear surfaces of a sheet can be prevented.

FIG. 7 is a flowchart illustrating an exemplary light exposure time correction process in first image forming apparatus 20. This process is achieved when CPU 281 of first control section 280 executes a predetermined program stored in ROM 282 upon the start of an image formation process in first image forming system 1 for example.

At step S301 of FIG. 7, first control section 280 acquires the coverage rate information of an image formed in a predetermined time (15 seconds) in first image forming apparatus 20, and computes the average coverage rate. While the coverage rate information is acquired from image data included in a printing job, the coverage rate information may also be acquired from the light exposure of first exposing device 2411 which is controlled on the basis of the image data and the like.

At step S302, first control section 280 determines whether the average coverage rate is not smaller than the second coverage rate (for example, 20%). When the average coverage rate is not smaller than 20% ("YES" at step S302), the process is advanced to step S303. When the average coverage rate is smaller than 20% ("NO" at step S302), that is, when the average coverage rate is not equal to or greater than 20%, the process is advanced to step S306.

When the state of the average coverage rate is not changed, the duration is integrated, and when the state of the average coverage rate is changed, the duration before the change is cleared.

At step S303, first control section 280 determines whether the duration during which the average coverage rate is 20% or greater has reached a predetermined time (for example, 5 minutes), that is, determines whether the state where the average coverage rate is 20% or greater has been continued for 5 minutes.

When the duration during which the average coverage rate is 20% or greater has reached 5 minutes ("YES" at step S303), the process is advanced to step S304. Specifically, since images having a high coverage rate have been continuously formed, the charging amount of toner may possibly be lowered, and consequently the line width may possibly be increased, thus increasing the half-tone density, and therefore, first light exposure time T1 is corrected as necessary. On the other hand, when the duration during which the average coverage rate is 20% or greater has not reached 5 minutes ("NO" at step S303), the process is advanced to step S309.

At step S304, first control section 280 determines whether first light exposure time T1 has already been changed by two levels. When first light exposure time T1 has already been changed by two levels ("YES" at step S304), the process is advanced to step S309. That is, when first light exposure time T1 has been changed by two levels, first light exposure time T1 is not further corrected. On the other hand, when first light exposure time T1 is not yet changed by two levels ("NO" at step S304), the process is advanced to step S305.

At step S305, first control section 280 shortens first light exposure time T1 by one level. At this point of time, the duration during which the average coverage rate is 20% or greater is once cleared. For example, when a state where the average coverage rate is 20% or greater is continued for 5 minutes, the light exposure time is shortened by one level, and when the state is further continued for 5 minutes, the light exposure time is further shortened by one level. The targeted half-tone density can be thus maintained since shorter light exposure time results in smaller line width.

At step S306, first control section 280 determines whether the duration during which the average coverage rate is smaller than 20% has reached a predetermined time (for example, 5 minutes), that is, determines whether a state where the average coverage rate is smaller than 20% has been continued for 5 minutes.

When the duration during which the average coverage rate is smaller than 20% has reached 5 minutes ("YES" at step S306), the process is advanced to step S307. It is expected that, since images having an average coverage rate have been continuously formed, the development performance is maintained, or the development performance is restored, and therefore, first light exposure time T1 is corrected as necessary. On the other hand, when the duration during which the average coverage rate is smaller than 20% has not reached 5 minutes ("NO" at step S306), the process is advanced to step S309.

At step S307, first control section 280 determines whether first light exposure time T1 is equal to the initial reference light exposure time. When first light exposure time T1 is equal to the reference light exposure time ("YES" at step S307), the process is advanced to step S309. When first light exposure time T1 is not equal to the reference light exposure time ("NO" at step S307), the process is advanced to step S308.

At step S308, first control section 280 lengthens first light exposure time T1 by one level. At this point of time, the duration during which the average coverage rate is smaller than 20% is once cleared. For example, when a state where the average coverage rate is smaller than 20% is continued for 5 minutes after a state where the average coverage rate is 20% or greater is continued for 5 minutes and first light exposure time T1 is lengthened by one level, the first light exposure time T1 is reset to the reference light exposure time.

At step S309, first control section 280 determines whether a series of image formation processes have been completed. When the series of image formation processes have been completed ("YES" at step S309), the light exposure time correction process is terminated, and when the series of image formation processes have not been completed ("NO" at step S309), the processes subsequent to step S301 are repeated.

A light exposure time correction process as mentioned above is performed also in second image forming apparatus 40. As described, in the present embodiment, first light exposure time T1 in first image forming apparatus 20 and second light exposure time T2 in second image forming apparatus 40 are corrected on the basis of the coverage rate of the continuously formed images.

To be more specific, when the average coverage rate of a predetermined number of images continuously formed in first image forming apparatus 20 is continuously smaller than the second coverage rate (for example, 20%) for a predetermined period (for example, 5 minutes), first light exposure time T1 is set to a value shorter than the current value. In addition, when the average coverage rate of a predetermined number of images continuously formed in second image forming apparatus 40 is continuously smaller than the second coverage rate (for example, 20%) for a predetermined period (for example, 5 minutes), second light exposure time T2 is set to a value shorter than the current value so that the light exposure energy decreases.

In this manner, it is possible to prevent the charging amount of toner from being decreased when images having a high coverage rate are continuously formed in first image forming apparatus 20 or second image forming apparatus 40, and consequently a constant line width can be maintained. Thus, a density difference which is gradually caused between the front and rear surfaces of a sheet can be prevented.

EXAMPLE

In the example, in image formation system 1, after inter-apparatus density adjustment was performed, an A4-size image was formed on 10,000 sheets while correcting density control points D1 and D2 and light exposure times T1 and T2 in accordance with the coverage rate of the image. In first image forming apparatus 20 (upstream apparatus), the images formed on 10,000 sheets each had a coverage rate of 5%. In second image forming apparatus 40 (downstream apparatus), the images formed on first 5,000 sheets each had a coverage rate of 1%, and the images formed on next 5,000 sheets each had a coverage rate of 30%.

COMPARATIVE EXAMPLE

In the comparative example, in image formation system 1, after the inter-apparatus density adjustment was performed, an A4-size image was formed on 10,000 sheets without correcting density control points D1 and D2 and light exposure times T1 and T2 in accordance with the coverage rate of the image. Other conditions were the same as those of the example.

In the example and the comparative example, every time when image formation processes for 1,000 sheets were completed, a pattern image for a highest density evaluation (solid image having a target image density of 1.55) and a pattern image for a half-tone density evaluation (halftone image having a target image density of 0.80) were formed on sheets, and the densities were measured using a reflection-type density detection sensor (available from X-rite, Inc.).

Figure 8A:
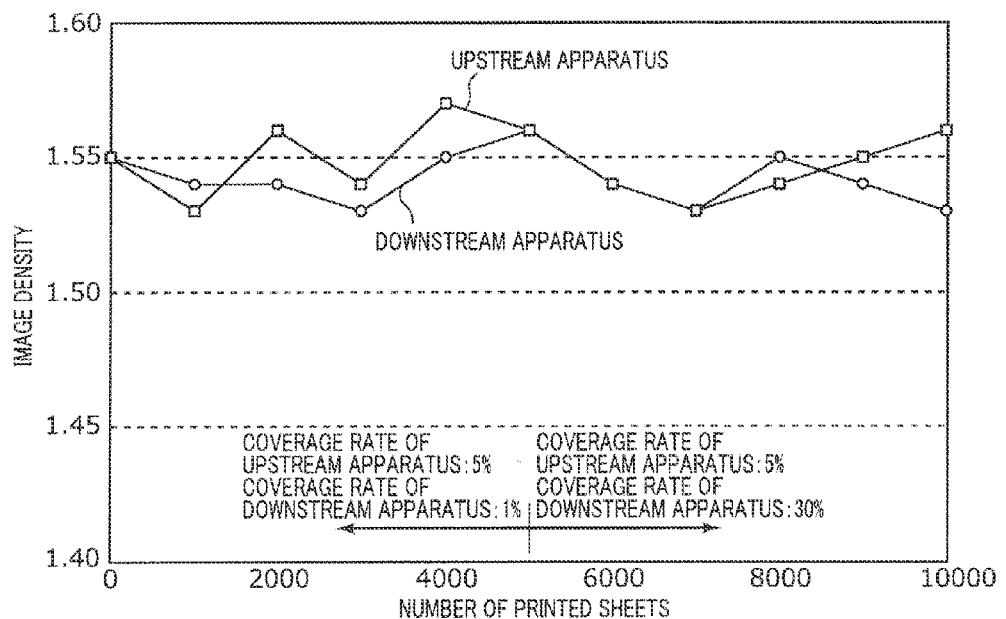
FIGS. 8A and 8B show measurement results (reflection density) of a pattern image for a highest density evaluation.
Figure 8B:
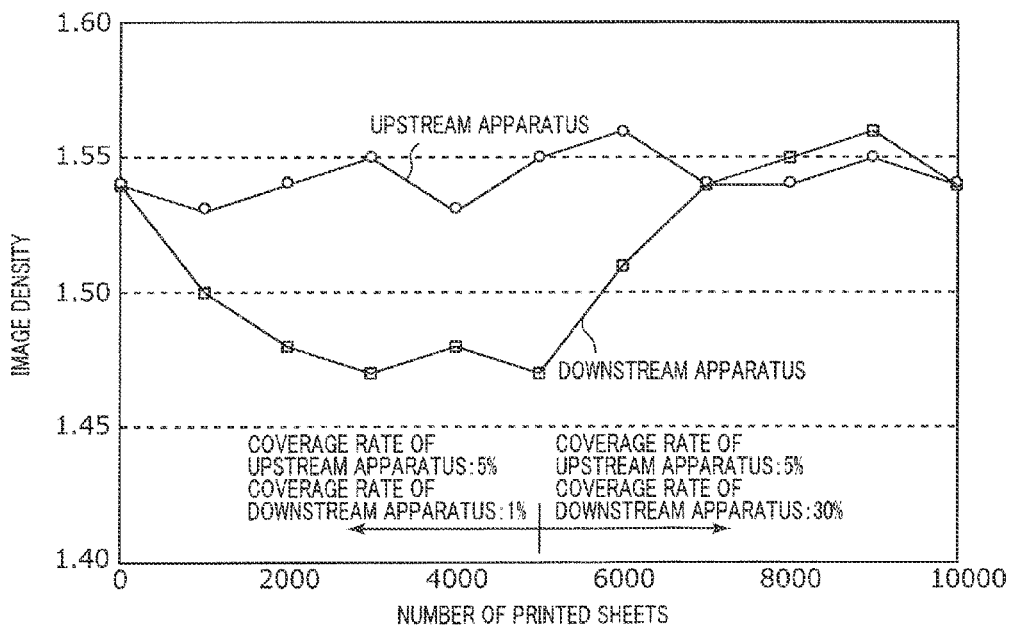
Figure 9A:
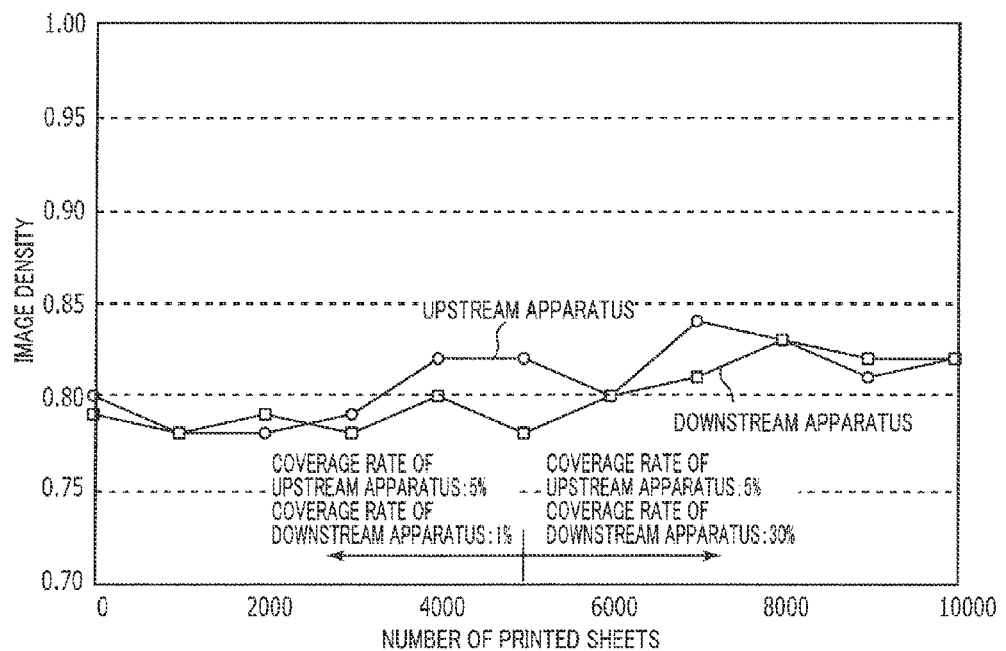
FIGS. 9A and 9B show measurement results (reflection density) of a pattern image for a half-tone density evaluation.
Figure 9B:
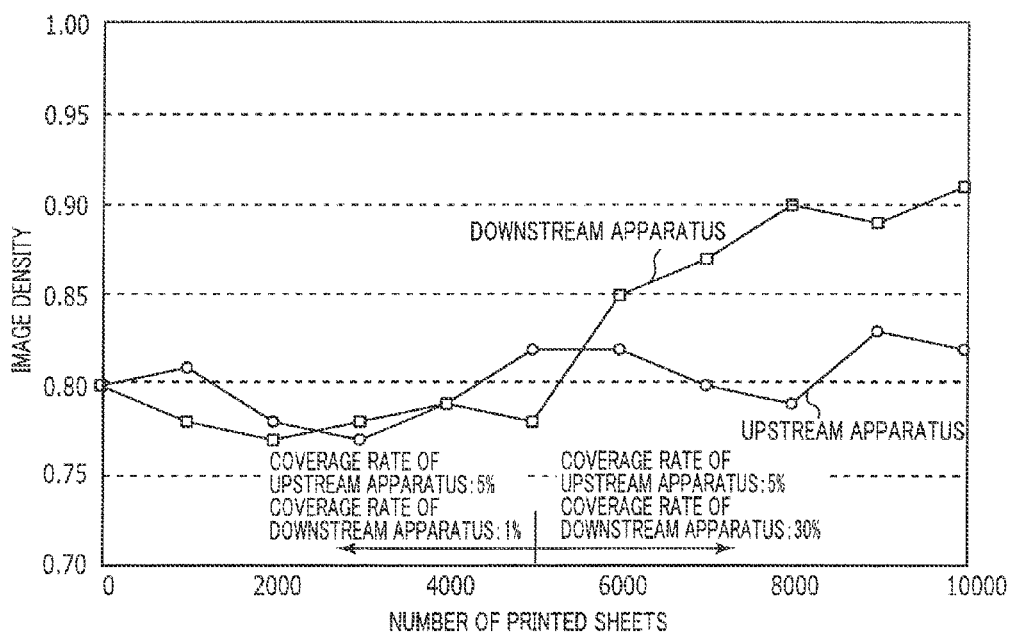

FIG. 8A illustrates measurement results of the pattern image for the highest density evaluation in the example, and FIG. 8B illustrates measurement results of the pattern image for the highest density evaluation in the comparative example. FIG. 9A illustrates measurement results of the pattern image for the half-tone density evaluation in the example, and FIG. 9B illustrates measurement results of the pattern image for the half-tone density evaluation in the comparative example.

In the case where the control on the basis of the coverage rate of images is not performed as with the comparative example, the density of the solid image output at a low coverage rate (see FIG. 8B) and the density of the halftone image output at a high coverage rate (see FIG. 9B) are changed, and the density difference between the upstream apparatus and the downstream apparatus, that is, the density difference between the front and rear surfaces, was 0.1 or greater.

In contrast, in the case where the control on the basis of the coverage rate of images is performed as with the example, the density difference between the upstream apparatus and the downstream apparatus, that is, the density difference between the front and rear surfaces was smaller than 0.1 regardless of the coverage rate of the images (see FIG. 8A and FIG. 9A).

While the invention made by the present inventor has been specifically described based on the preferred embodiments, it is not intended to limit the present invention to the above-mentioned preferred embodiments but the present invention may be further modified within the scope and spirit of the invention defined by the appended claims.

For example, at the time of correcting the light exposure energy of first exposing device 2411 and second exposing device 4411, the light exposure output (the amount of the light exposure per unit time) may be corrected instead of the light exposure time.

In addition, for example, at the time of the image density control, image formation conditions (density control parameters), such as the developing bias voltage, other than the rotational frequency of the developing roller may be controlled.

It is to be noted that, in a case where a toner image is directly transferred from a photoconductor to a sheet, the photoconductor serves as the image bearing member of the embodiment of the present invention. In this case, the toner image density detection section detects the density of the toner pattern formed on the photoconductor.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

What is claimed is:

1. An image formation system comprising:
   a first image forming apparatus;
   a sheet inversion section;
   a second image forming apparatus;
   an image density detection section; and
   an inter-apparatus density adjusting section;
   the first image forming apparatus including:
      a first photoconductor;
      a first charging section configured to charge a surface of the first photoconductor;
      a first light exposure section configured to irradiate the first photoconductor with light to form an electrostatic latent image;
      a first development section configured to supply developer to visualize the electrostatic latent image;
      a first image bearing member configured to bear a visualized toner image that is to be transferred to a first surface of a sheet;
      a first fixing section configured to fix a toner image transferred to a sheet;
      a first toner image density detection section configured to detect a density of a toner pattern borne on the first image bearing member; and
      a first density control section configured to control an image formation condition such that a detection result of the first toner image density detection section matches a first target control density determined by a first density control point;
   the sheet inversion section being disposed on a downstream side of the first image forming apparatus in a sheet conveyance direction, and configured to invert a sheet output from the first image forming apparatus;
   the second image forming apparatus being disposed on a downstream side of the sheet inversion section in the sheet conveyance direction, and including:
      a second photoconductor;
      a second charging section configured to charge a surface of the second photoconductor;
      a second light exposure section configured to irradiate the second photoconductor with light to form an electrostatic latent image;
      a second development section configured to supply developer to visualize the electrostatic latent image;
      a second image bearing member configured to bear a visualized toner image that is to be transferred to a second surface of a sheet;
      a second fixing section configured to fix a toner image transferred to a sheet;
      a second toner image density detection section configured to detect a density of a toner pattern borne on the second image bearing member; and
      a second density control section configured to control an image formation condition such that a detection result of the second toner image density detection section matches a second target control density determined by a second density control point;
   the image density detection section being disposed on a downstream side of the second image forming apparatus in the sheet conveyance direction, and configured to detect a density of a first pattern image for a highest density adjustment and a density of a second pattern image for a half-tone density adjustment, each of the first and second pattern images being formed on a sheet in each of the first image forming apparatus and the second image forming apparatus;

the inter-apparatus density adjusting section being configured to correct the first density control point or the second density control point on a basis of a detection result of the first pattern image of the image density detection section, and to correct a light exposure energy of the first light exposure section or a light exposure energy of the second light exposure section on a basis of a detection result of the second pattern image, wherein the first density control section corrects the first density control point or the light exposure energy of the first light exposure section in accordance with a coverage rate of an image formed in the first image forming apparatus, and the second density control section corrects the second density control point or the light exposure energy of the second light exposure section in accordance with a coverage rate of an image formed in the second image forming apparatus.

2. The image formation system according to claim 1, wherein the first density control section increases the first density control point to a value higher than a current value when an average coverage rate of a predetermined number of images continuously formed in the first image forming apparatus is continuously smaller than a first coverage rate for a predetermined period, and the second density control section increases the second density control point to a value higher than a current value when an average coverage rate of a predetermined number of images continuously formed in the second image forming apparatus is continuously smaller than the first coverage rate for a predetermined period.

3. The image formation system according to claim 1, wherein the first density control section reduces the light exposure energy of the first light exposure section to a value smaller than a current value when an average coverage rate of a predetermined number of images continuously formed in the first image forming apparatus is continuously equal to or greater than a second coverage rate for a predetermined period, and the second density control section reduces the light exposure energy of the second light exposure section to a value smaller than a current value when an average coverage rate of a predetermined number of images continuously formed in the second image forming apparatus is continuously equal to or greater than the second coverage rate for a predetermined period.

4. A density controlling method for an image formation system, the image formation system including:
a first image forming apparatus;
a sheet inversion section; and
a second image forming apparatus;
the first image forming apparatus including:
  a first photoconductor;
  a first charging section configured to charge a surface of the first photoconductor;
  a first light exposure section configured to irradiate the first photoconductor with light to form an electrostatic latent image;
  a first development section configured to supply developer to visualize the electrostatic latent image;
  a first image bearing member configured to bear a visualized toner image that is to be transferred to a first surface of a sheet;
  a first fixing section configured to fix a toner image transferred to a sheet; and
  a first toner image density detection section configured to detect a density of a toner pattern borne on the first image bearing member;
  the first image forming apparatus being configured to control an image formation condition such that a detection result of the first toner image density detection section matches a first target control density determined by a first density control point;
the sheet inversion section being disposed on a downstream side of the first image forming apparatus in a sheet conveyance direction, and configured to invert a sheet output from the first image forming apparatus;
the second image forming apparatus being disposed on a downstream side of the sheet inversion section in the sheet conveyance direction, and including:
  a second photoconductor;
  a second charging section configured to charge a surface of the second photoconductor;
  a second light exposure section configured to irradiate the second photoconductor with light to form an electrostatic latent image;
  a second development section configured to supply developer to visualize the electrostatic latent image;
  a second image bearing member configured to bear a visualized toner image that is to be transferred to a second surface of a sheet;
  a second fixing section configured to fix a toner image transferred to a sheet; and
  a second toner image density detection section configured to detect a density of a toner pattern borne on the second image bearing member;
  the second image forming apparatus being configured to control an image formation condition such that a detection result of the second toner image density detection section matches a second target control density determined by a second density control point;
the method comprising:
detecting a density of a first pattern image for a highest density adjustment and a density of a second pattern image for a half-tone density adjustment, each of the first and second pattern images being formed on a sheet in each of the first image forming apparatus and the second image forming apparatus;
correcting the first density control point or the second density control point on a basis of a detection result of the first pattern image of the image density detection section, and to correct a light exposure energy of the first light exposure section or a light exposure energy of the second light exposure section on a basis of a detection result of the second pattern image;
correcting, in the first image forming apparatus, the first density control point or the light exposure energy of the first light exposure section in accordance with a coverage rate of an image formed in the first image forming apparatus; and
correcting, in the second image forming apparatus, the second density control point or the light exposure energy of the second light exposure section in accordance with a coverage rate of an image formed in the second image forming apparatus.

5. The density controlling method according to claim 4, wherein, in the first image formation apparatus, the first density control point is increased to a value higher than a current value when an average coverage rate of a predetermined number of images continuously formed in the first image forming apparatus is continuously smaller than a first coverage rate for a predetermined period, and, in the second image formation apparatus, the second density control point is increased to a value higher than a current value when an average coverage rate of a predetermined number of images continuously formed in the second image forming apparatus is continuously smaller than the first coverage rate for a predetermined period.

6. The density controlling method according to claim 4, wherein,
in the first image formation apparatus, the light exposure energy of the first light exposure section is reduced to a value smaller than a current value when an average coverage rate of a predetermined number of images continuously formed in the first image forming apparatus is continuously equal to or greater than a second coverage rate for a predetermined period, and,
in the second image formation apparatus, the light exposure energy of the second light exposure section is reduced to a value smaller than a current value when an average coverage rate of a predetermined number of images continuously formed in the second image forming apparatus is continuously equal to or greater than the second coverage rate for a predetermined period.

* * * * *